G. H. Brown,

Straw Cutter.

No. 85,923. Patented Jan. 19, 1869.

Witnesses:
A. W. Almont
Wm. A. Morgan

Inventor:
Oran H. Brown
Per Munn & Co.
his Atty.

CHARLES H. BROWN, OF BLOOMINGBURG, NEW YORK.

*Letters Patent No. 85,993, dated January 19, 1869.*

IMPROVEMENT IN STRAW-CUTTER.

The Schedule referred to in these Letters Patent and making part of the same.

*To all whom it may concern:*

Be it known that I, CHARLES H. BROWN, of Bloomingburg, in the county of Sullivan, and State of New York, have invented a new and useful Improvement in Straw-Cutters; and I do hereby declare that the following is a full, clear, and exact description thereof, which will enable others skilled in the art to make and use the same, reference being had to the accompanying drawings, forming a part of this specification.

Similar letters of reference indicate corresponding parts.

My invention has for its object to furnish an improved machine for cutting straw, hay, corn-stalks, vegetables, &c., which shall be simple in construction, and effective in operation, and which may be easily adjusted to cut the straw, hay, or stalks of any desired length, or the vegetables of any desired thickness, whether said vegetables be large or small; and It consists in the construction and combination of various parts of the machine, as hereinafter more fully described.

A is the frame of the machine.

B is the horizontal cutter-wheel, which is securely attached to the vertical shaft C, which revolves in bearings in the frame A.

To the upper part of the vertical shaft C is attached a bevel-gear wheel, D, into the teeth of which mesh the teeth of the bevel-gear wheel E, attached to one end of the horizontal shaft F, which revolves in bearings in the upper part of the frame A, and to the other end of which is attached the crank G, by means of which the machine is operated.

The cutter-wheel B is provided with two knives, H, the ends of which are secured to the ends of the steel springs I, the other ends of which are secured to the solid body of the wheel B.

The ends of the springs I, and of the knives H, are secured to each other, and to the wheel B, by set-screws, so that the knives may be raised or lowered to adjust them accurately to the mouth-piece of the feed-box.

The knives H are so set in the wheel B, that they may act upon the material in the feed-box with a shear-cut.

The parts $b^1$ of the body of the wheel, directly in front of the knives H, are made movable, and are hinged to the stationary parts $b^2$ of the body of the said wheel.

Figure 1:
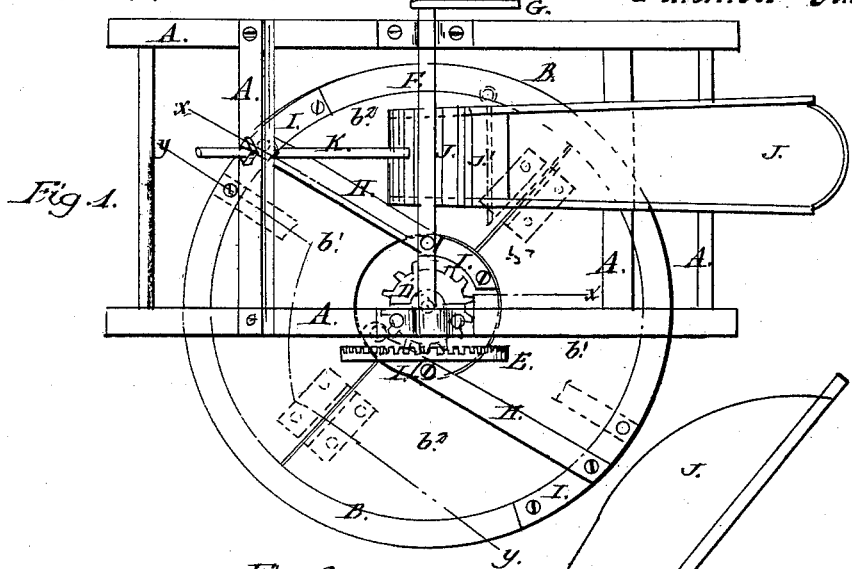
Figure 1 is a top or plan view of my improved machine.
Figure 2:
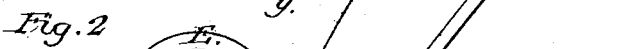
Figure 2 is a side view of the same, part of the feed-box being broken away to show the construction.
Figure 2:
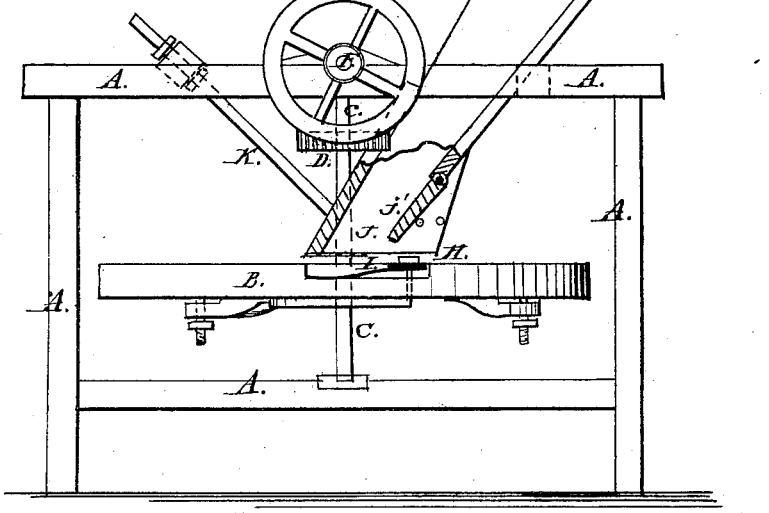
Figure 3:
Figure 3 is a detail sectional view of the cutter-wheel, taken through the line $x\, x$, fig. 1.
Figure 4:
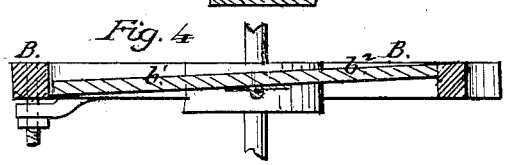
Figure 4 is a detail sectional view of the cutter-wheel, taken through the line $y\, y$, fig. 1.

The forward parts of the pieces $b^1$ are supported by set-screws passing through arms attached to the said parts $b^1$, and screwing into the rim of the said wheel B, as shown in figs. 2 and 4, and in dotted lines in fig. 1. This construction enables the parts $b^1$ of the body of the wheel to be raised and lowered to set the machine to cut the material of any desired length.

The stationary parts $b^2$ of the wheel B, and the movable parts $b^1$, are so formed that the surface of the said wheel may incline gradually from the back of the one knife to the edge of the other, as shown in fig. 4.

J is the feed-box, which is attached to a cross-bar of the frame A, in such a position that its lower end may be just above the surface of the wheel B, as shown in fig. 2.

The lower end of the feed-box J is adjustably supported in place by the rod K, the lower end of which is secured to the lower part of the said feed-box, and the upper end of which passes through a cross-bar of the frame A, to which it is adjustably attached by nuts placed upon the said rod, the one above and the other below the said cross-bar, so that the lower end of the said feed-box J may be raised or lowered to adjust it to the cutter-wheel B.

The lower part $j'$ of the bottom of the feed-box J is made movable, and is pivoted or hinged, at its upper edge, to the body of the said feed-box, so that its lower part may be moved forward or back, to enlarge or diminish the size of the throat of the feed-box, according to the character of the material to be cut. The lower part of the movable part $j'$, when adjusted, is supported in place by a rod passing through holes in the side-boards of said feed-box J.

The lower edge of the feed-box J should be faced with a steel mouth-piece, against which the material is pressed while being cut by the knife H.

Having thus described my invention,

I claim as new, and desire to secure by Letters Patent—

1. Forming the cutter-wheel B, with the parts $b^1$ directly in front of the knives H, movable, and with the upper surface inclined from the rear edge of the one knife to the front or cutting-edge of the other, substantially as herein shown and described, and for the purposes set forth.

2. The combination of the knives H and springs I with the wheel B, substantially as herein shown and described, and for the purpose set forth.

CHARLES H. BROWN.

Witnesses:
WM. B. DIMMICK,
H. F. OLIVER.